United States Patent
Saldanha et al.

(10) Patent No.: US 11,548,643 B2
(45) Date of Patent: Jan. 10, 2023

(54) CABIN ATTENDANT SEAT WITH HEIGHT ADJUSTABLE SEAT PAN

(71) Applicant: B/E Aerospace, Inc., Winston-Salem, NC (US)

(72) Inventors: Nikhil Anthony Saldanha, Bangalore (IN); Naveen B. Lokanatha, Bangalore (IN)

(73) Assignee: B/E Aerospace, Inc., Winston Salem, NC (US)

( * ) Notice: Subject to any disclaimer, the term of this patent is extended or adjusted under 35 U.S.C. 154(b) by 0 days.

(21) Appl. No.: 17/374,510

(22) Filed: Jul. 13, 2021

(65) Prior Publication Data

US 2022/0194593 A1  Jun. 23, 2022

(30) Foreign Application Priority Data

Dec. 21, 2020 (IN) .............................. 202041055590

(51) Int. Cl.
*B64D 11/06* (2006.01)

(52) U.S. Cl.
CPC ........ *B64D 11/064* (2014.12); *B64D 11/0691* (2014.12)

(58) Field of Classification Search
CPC .......................... B64D 11/0691; B64D 11/064
USPC .......................................................... 297/14
See application file for complete search history.

(56) References Cited

U.S. PATENT DOCUMENTS

| 3,594,037 A * | 7/1971 | Sherman ............ B64D 11/0691 |
| | | 297/14 |
| 4,740,030 A | 4/1988 | Nordskog |
| 9,642,452 B2 | 5/2017 | Fecheyr-Lippens et al. |
| 9,856,024 B2 | 1/2018 | Burd |
| 2014/0368012 A1 | 12/2014 | Burd |

FOREIGN PATENT DOCUMENTS

| CN | 102440584 A | 5/2012 |
| DE | 102010054942 A1 | 6/2012 |
| FR | 2898087 B1 | 5/2008 |
| KR | 200381387 Y1 | 4/2005 |
| KR | 200382349 Y1 | 4/2005 |
| KR | 101400683 B1 | 5/2014 |

OTHER PUBLICATIONS

Extended Search Report in European Application No. 21216082.4 dated May 12, 2022, 7 pages.

* cited by examiner

*Primary Examiner* — Anthony D Barfield
(74) *Attorney, Agent, or Firm* — Suiter Swantz pc llo

(57) ABSTRACT

Disclosed is a height adjustable seat pan assembly such as for use in an aircraft cabin attendant seat. The assembly includes a seat pan supported between spaced frame members defining guide tracks including successive pivot positions each corresponding to a different seat pan height. The seat pan is movable between a deployed condition and a stowed condition in which the seat pan stows generally vertically below a backrest to provide a low profile seat in the stowed condition. Features provided on opposing sides of the seat pan interact with the successive pivot positions in the guide tracks, and the seat can be repositioned to a different pivot position to change the seat pan height. Pivoting motion of the seat pan between the stowed and deployed conditions locks or unlocks the seat pan relative to its aligned successive pivot position.

18 Claims, 12 Drawing Sheets

CABIN ATTENDANT SEAT WITH HEIGHT ADJUSTABLE SEAT PAN

TECHNICAL FIELD

The subject matter disclosed herein relates generally to seat assemblies for aircraft, and more particularly to a cabin attendant seat having a stowable and repositionable seat pan for varying the seat height.

BACKGROUND

Modern aircraft are typically equipped with cabin attendant seats for use by the cabin crew during taxi, takeoff and landing of the aircraft. Cabin attendant seats are typically located near the aircraft exits to position the cabin crew to assist passengers exiting the aircraft during an emergency event. Most cabin attendant seats include a fixed backrest and a pivoting seat pan coupled to a frame, wherein the seat pan is configured to stow against the backrest between uses to position the seat pan out of the aisle ways.

While most vehicle seats have provisions for adjustability for improving seat comfort (e.g., backrest angle, seat pan tilt, headrest level, lumbar, etc.), conventional cabin attendant seats implementing a hinged seat pan have a fixed seat pan height accommodating a general physique of a particular demographic. Considering an ergonomic seating posture requires the occupant's knees to be either at the same level as their hips or slightly lower, a fixed seat pan height can cause discomfort to an occupant of either very tall or very short stature.

Therefore, it would be desirable to provide a repositionable seat pan that overcomes the aforementioned and other disadvantages associated with hinged seat pans.

BRIEF SUMMARY

One aspect of the present disclosure provides a cabin attendant seat (CAS) for an aircraft. Spaced frame members include parallel guide tracks each having a linear portion and successive pivot positions formed at one end of the linear portion. Each of the successive pivot positions corresponds to a different seat pan height. A backrest is coupled to the spaced frame elements above the parallel guide tracks. A seat pan movably coupled to the parallel guide tracks is configured to translate along the linear portions of the guide tracks when the seat pan is in a stowed condition and configured to pivot between the stowed condition and a deployed condition when aligned with one of the successive pivot positions, wherein the seat pan pivots toward the deployed condition to lock the seat pan in the aligned one of the successive pivot positions and pivots toward the stowed condition to unlock the seat pan from engagement in the aligned one of the successive pivot positions. In the fully stowed condition the seat pan resides below the backrest to provide a low profile CAS.

In some embodiments, each of the successive pivot positions is a circular opening having a diameter which is greater than a width of the linear portion.

In some embodiments, the seat pan on each opposing side therefore includes a hinge pin engaged in one of the parallel guide tracks having a first portion for maintaining the hinge pin in the guide track and a second portion extending from the first portion and defining a feature that interacts in a first orientation with the linear portion to permit vertical translation of the hinge pin along the linear portion, and interacts in a second orientation with one of the successive pivot positions to prevent vertical translation of the hinge pin. A lever is coupled to the hinge pin such that pivoting motion of the lever arm rotates the feature between the first and second orientations.

In some embodiments, the feature includes first and second pairs of diagonally opposed parallel faces wherein the first pair of parallel faces interacts with the linear portion when the seat pan is in the fully stowed condition, the second pair of diagonally opposed faces interacts with the linear portion when the seat pan is in the stowed condition, the seat pan is most vertical when in the fully stowed condition, and the feature is longer than the width of the linear portion.

In some embodiments, the seat pan on each opposing side thereof includes a hinge pin slidable along a length of one of the guide tracks, a barrel lock positioned over a cylindrical portion of the hinge pin and defining a longitudinally extending helical slot, a pin received through the helical slot and received in an opening formed in the cylindrical portion, and a lever arm coupled to the barrel lock. In use, when the seat pan is aligned with one of the successive pivot positions, pivoting motion of the lever arm toward the deployed condition drives the barrel lock horizontally into engagement with the aligned one of the successive pivot positions and pivoting motion of the lever arm toward the stowed condition drives the barrel lock horizontally out of engagement with the alignment one of the successive pivot positions, wherein driving motion is driven by movement of the pin along the length of the longitudinally extending helical slot.

In some embodiments, the pin is operable for converting the pivoting motion of the lever arm into helical motion of the barrel lock.

In some embodiments, the barrel lock and the lever arm are slidably coupled to permit horizontal translation of the barrel lock relative to the lever arm as the lever arm pivots between the stowed condition and the deployed condition of the seat pan.

In some embodiments, the barrel lock includes diametrically opposed longitudinal slots formed along an exterior surface of the barrel lock, wherein barrel screws threaded through the lever arm engage in the diametrically opposed longitudinal slots to guide the horizontal translation of the barrel lock relative to the lever arm.

In some embodiments, the assembly further includes a biasing mechanism coupled to the seat pan for urging the seat pan toward the fully stowed condition.

Another aspect of the present disclosure provides a height adjustable seat pan assembly including spaced frame members having parallel guide tracks defining successive pivot positions arranged in vertical alignment, wherein each successive pivot position corresponds to a different seat pan height. A seat pan movably coupled to the guide tracks translates between different successive pivot positions when the seat pan is in a stowed condition, and pivots between the stowed condition and a deployed condition when aligned with one of the successive pivot positions. The seat pan pivots toward the deployed condition to lock the seat pan in the aligned one of the successive pivot positions and pivots toward the stowed condition to unlock the seat pan from engagement in the aligned one of the successive pivot positions.

In some embodiments, the spaced frame members are associated with an aircraft seat.

In some embodiments, the spaced frame members are associated with an aircraft cabin attendant seat.

This brief summary is provided solely as an introduction to subject matter that is fully described in the detailed description and illustrated in the drawings. This brief summary should not be considered to describe essential features nor be used to determine the scope of the claims. Moreover, it is to be understood that both the foregoing summary and the following detailed description are exemplary and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
FIGS. 1A-1D show conceptually the general operation of the cabin attendant seat in accordance with embodiments of the present disclosure.
Figure 1B:
Figure 1C:
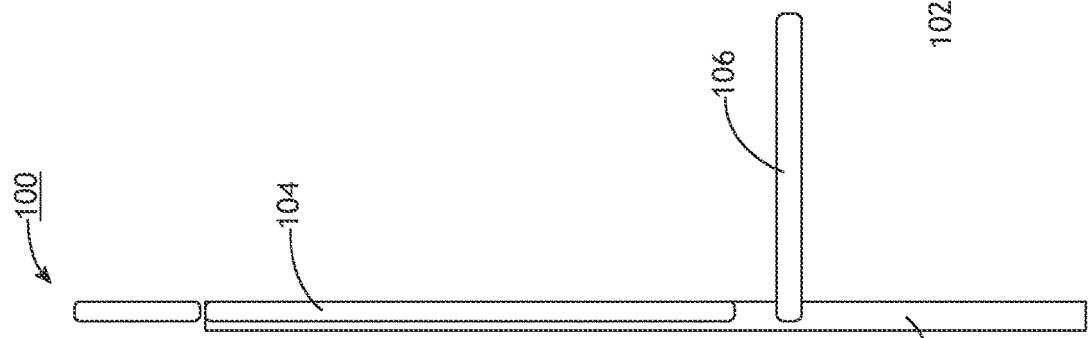
Figure 1D:
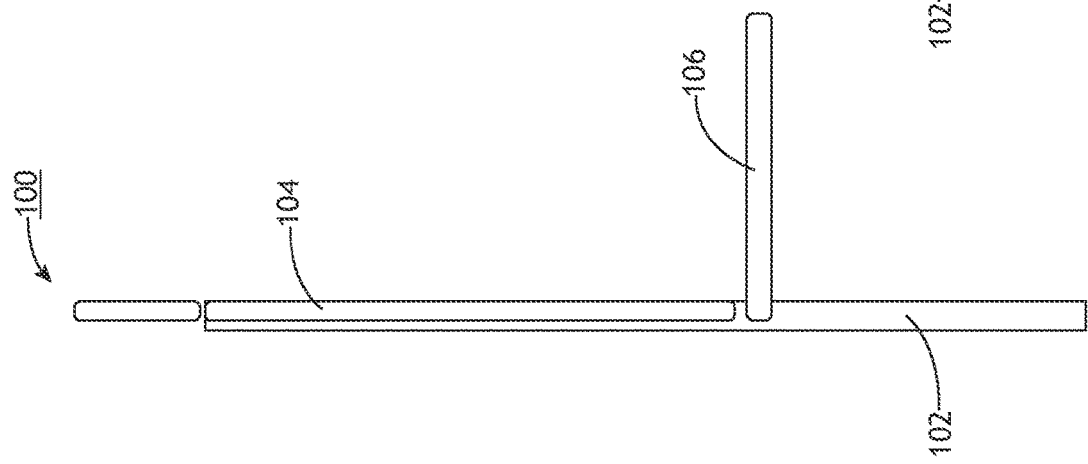

Before explaining one or more embodiments of the disclosure in detail, it is to be understood that the embodiments are not limited in their application to the details of construction and the arrangement of the components set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, the present disclosure describes a vehicle seat implemented as an aircraft cabin attendant seat including a stowable and repositionable seat pan for varying the seat pan height.

With reference to FIGS. 1A-1D, a cabin attendant seat (CAS) 100 is shown conceptually to illustrate the general working of the seat. As used herein, the term CAS is intended to refer to any auxiliary seat type implemented in an aircraft, other conveyance type, or elsewhere. The CAS 100 generally includes a structural frame 102 configured for attachment to a wall, monument, floor, seating unit, or elsewhere. A backrest 104 is coupled to and supported by the frame 102. In some embodiments, the backrest is fixed. A seat pan 106 is mounted separate from the backrest 104 and is movably coupled to the frame 102, and according to the present disclosure, is movable between a stowed condition shown in FIG. 1D in which the seat pan is vertical or substantially vertical, and a deployed conditions at a different height shown in each of FIGS. 1A-1C in which the seat pan is horizontal or at a slight angle to horizontal (e.g., tilted) to provide an ergonomic sitting position. As used herein, the term "deployed condition" refers to the usable state of the seat pan for sitting (e.g., "open"), the term "fully stowed condition" refers to the seat pan state when positioned vertically below the backrest (e.g., "closed"), and the term "stowed condition" refers to any intermediate state between the deployed condition and the fully stowed condition (e.g., partially open or closed). As such, movement toward the deployed conditioned is referred to herein as "opening" the seat pan, and movement toward the stowed conditions is referred to herein as "closing" the seat pan.

The seat pan 106 is selectively repositionable along certain portions of the frame 102 to vary or adjust the seat pan height according to occupant preference. When not in use, the seat pan 106 closes (e.g., pivots) and descends (e.g., translates) down the frame into position below the backrest 104, thus providing a stowed seat having a very thin profile. As discussed further below, direct motion of deploying the seat pan 106 locks the seat pan in place at a chosen height, and direction motion of stowing the seat pan allows the seat pan to move to a different chosen height or to be stowed. The same mechanism operable for locking the seat pan 106 in the deployed condition prevents the seat pan from deploying inadvertently when not in use.

Figure 2:
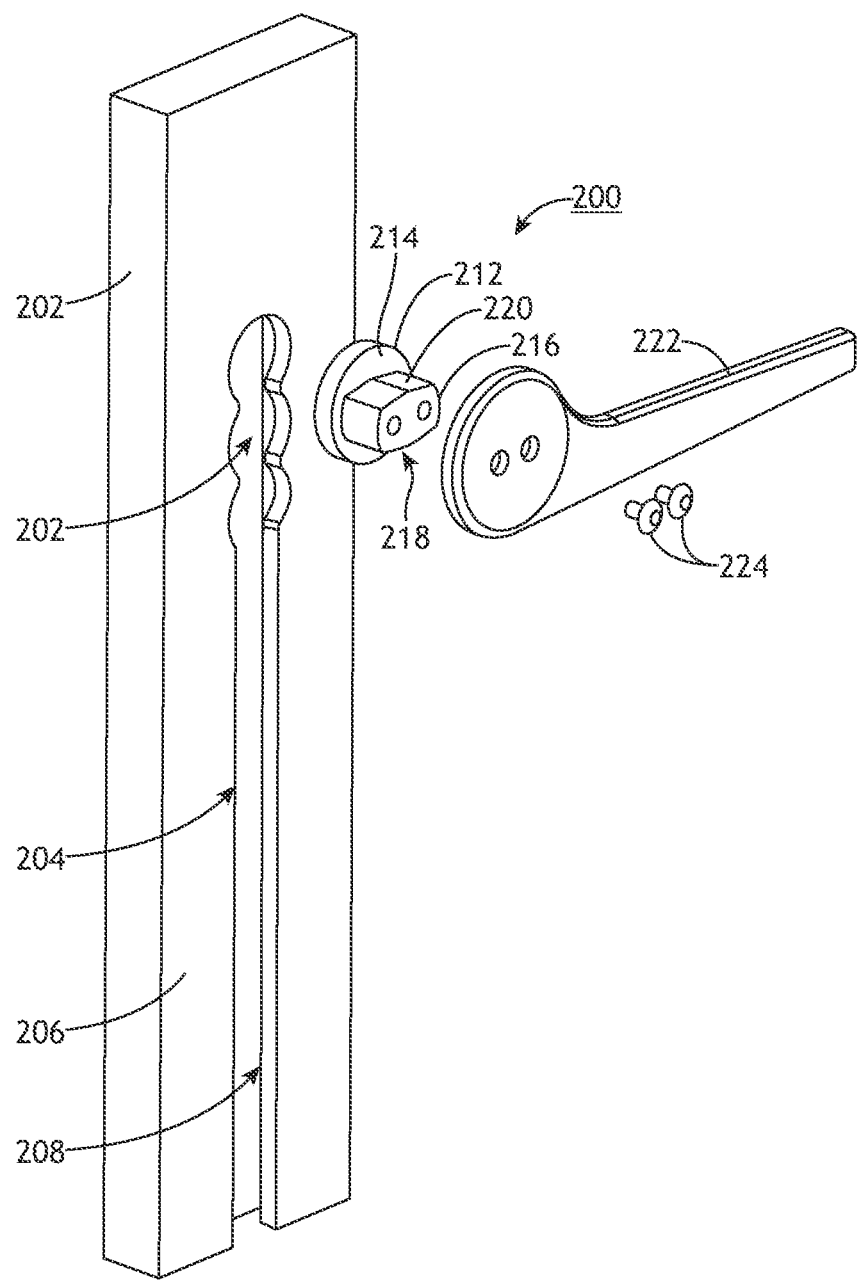
FIG. 2 shows an exploded view of the seat pan hinge pin in accordance with a first embodiment of the present disclosure.

With reference to FIG. 2, according to an exemplary embodiment of the present disclosure, a portion of a first mechanism for stowing the seat pan and enabling height adjustment is shown generally at 200. While only one-half of the mechanism 200 is shown and without the seat pan for clarity of the disclosure, it is understood that the mechanism includes like elements symmetrically positioned in spaced apart relation supporting a seat pan therebetween. The mechanism 200 includes frame elements 202 positioned in spaced apart relation which may be implemented as elongate vertical members supporting both the coupled backrest and the movably coupled seat pan. Each frame element 202 incorporates, defines or forms a vertical guide track 204 or slot along a portion of the length of its inboard facing side 206. In the complete mechanism, the guide tracks 204 face each other and are parallel and horizontally aligned.

Each guide track 204 includes an elongate linear portion 208 and successive pivot positions 210 formed at the upper end of the linear portion. In some embodiments, the guide track 204 may include a T-shaped slot within which a portion of the mechanism can slide. Each successive pivot position 210 corresponds to a different seat pan deployment height. As shown, each successive pivot position 210 may be a metered circular opening or profile formed through the face of the frame element 202. The successive pivot positions 210 are interconnected such that the seat pan can translate vertically along the entire length of the guide track 204 when in the stowed condition. A hinge pin 212 interacts with the guide track 204 by way of rotational and translational motion. For example, the hinge pin 212 translates relative to the guide track 204 when the seat pan is in the stowed condition or fully stowed condition, and rotates relative to the guide track when horizontally aligned with one of the successive pivot positions 210.

The hinge pin 212 defines a first portion 214 formed, for example, as an enlarged circular head dimensioned diametrically larger than the successive pivot positions 210 and width of the linear portion 208 to maintain engagement in the guide track 204. The hinge pin 212 further defines or includes a second portion 216 formed, for example, as a profiled feature 218 extending from the first portion 214. The profiled feature 218 interacts in a first orientation with the linear portion 208 of the guide track 204 to permit vertical translation of the hinge pin 212 along the linear portion, and interacts in a second orientation, different from the first orientation, when engaged in one of the successive pivot positions 210 to prevent vertical translation of the hinge pin and to lock the seat in place at its chosen vertical height. As shown, the profile includes opposed angled sides forming first and second pairs of diagonally opposed parallel faces 220.

The mechanism 200 further includes a lever arm 222 directly fixed to the hinge pin 212, for example, using a pair of set screws 224 that allow the lever arm and hinge pin to move as a single unit. The lever arm 222 couples to the seat pan, for example, by direct attachment to the side of the seat pan or incorporation into the seat pan construction.

With reference to FIGS. 3A-3F, the seat pan adjustment mechanism is shown in various positions and orientations. With specific reference to FIGS. 3A and 3B, the hinge pin 212 and lever arm 222 are shown positioned along the linear portion 208 of the guide track 204 corresponding to the closed or stowed condition of the seat pan. In some embodiments, the diagonally opposed parallel faces 220 provide a limited amount of pivotal motion or "play" in the mechanism when in the stowed condition to allow the "top" of the seat pan to clear the bottom of the backrest during initial vertical movement of the seat pan upward. In some embodiments, one pair of the diagonally opposed parallel faces 220 interacts with the linear portion 208 of the guide track 204 when the seat pan is in the fully stowed condition, and the other pair of the diagonally opposed parallel faces 220 interacts with the linear portion 208 of the guide track 204 when the seat pan is opened slightly to be translated vertically upward. The profiled feature 218 has a longitudinal dimension greater than the width of the linear portion 208 of the guide track 204 to prevent hinge pin rotation, beyond that between the fully stowed and stowed conditions, when the profiled feature 218 is substantially vertical, and has a length substantially equal to the diameter of the successive pivot positions 210 to prevent vertical translation when the seat pan is in the deployed condition or near the deployed condition when the profiled feature 218 is substantially horizontal. The diameter of each successive pivot position 210 is equal and is greater than the width of the linear portion 208 of the guide track 204 to prevent vertical translation when the profiled feature is substantially horizontal.

Figure 3C:
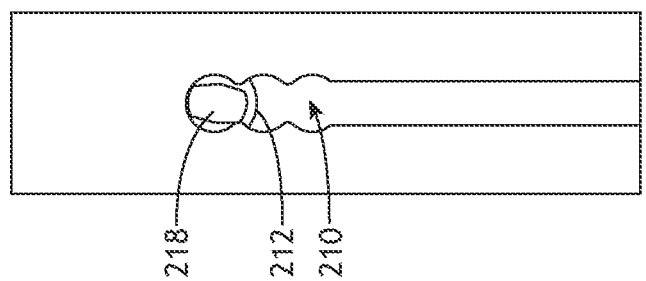
FIGS. 3A-3F show various positions of the hinge pin and corresponding conditions of the seat pan according to the first embodiment of the present disclosure.
Figure 3B:
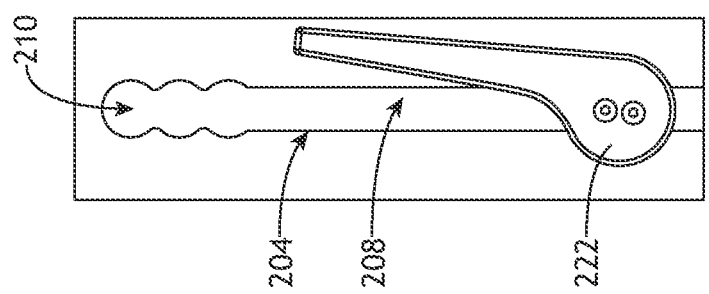
Figure 3A:
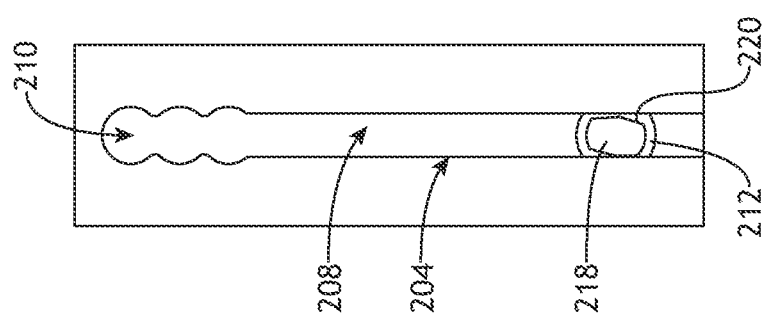
Figure 3D:
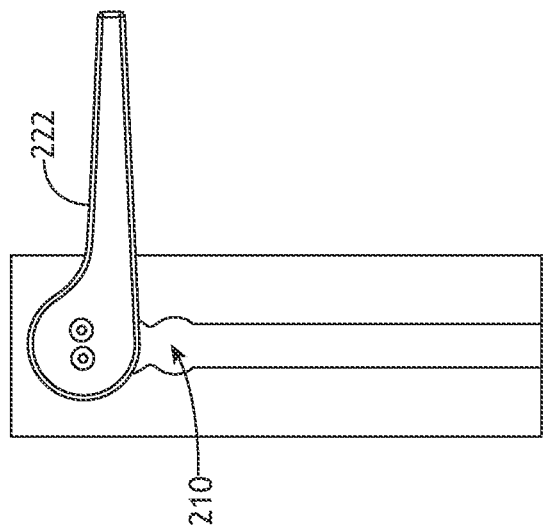
Figure 3E:
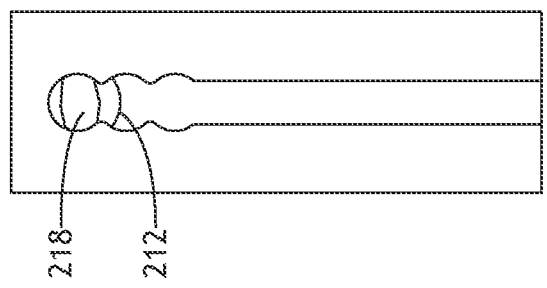
Figure 3F:
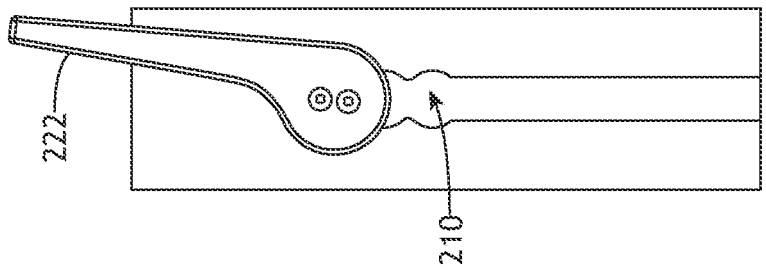

With specific reference to FIGS. 3C and 3D, the hinge pin 212 and attached lever arm 222 are shown raised into alignment with the uppermost successive pivot position to allow seat pan rotation. With specific reference to FIGS. 3E and 3F, the seat pan is opened to the deployed condition such that the profiled feature 218 of the hinge pin 212 is substantially horizontal, thereby locking the seat pan in the deployed condition. The seat pan can be repositioned to a different successive pivot position 210 to lower the seat pan height by reversing the seat pan movement sequence, i.e., closing the seat pan, vertically translating the hinge pin lower into horizontal alignment with a different successive pivot position, and opening the seat pan to lock the seat pan in place.

Figure 4A:
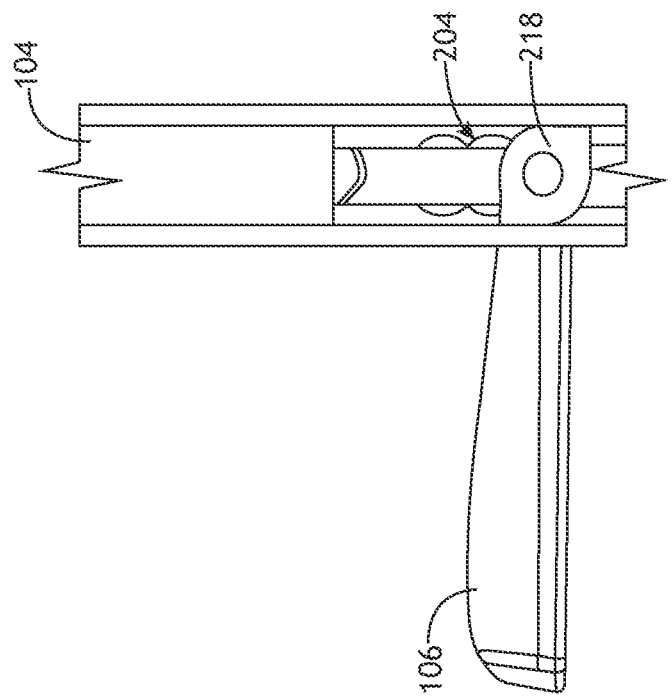
FIGS. 4A and 4B show an exemplary embodiment of a hard stop feature/profile for preventing over-rotation of the seat pan past the seating position.
Figure 4B:
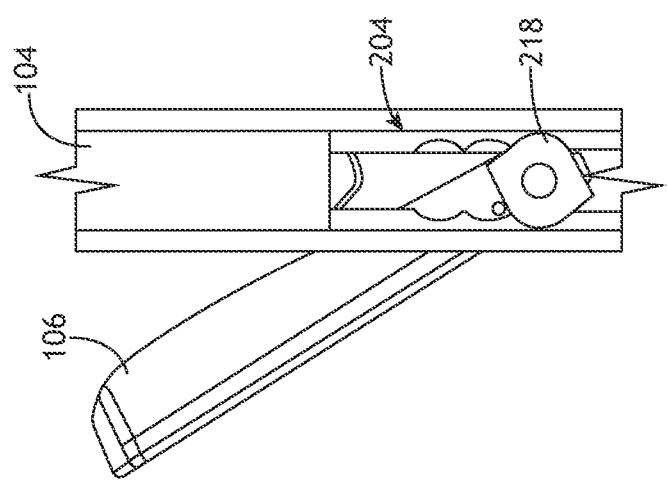

With reference to FIGS. 4A and 4B, seat pan over rotation past the deployed condition, the deployed condition corresponding to the sitting position, can be prevented using mechanical stops and/or profiled features of the hinge pin. As shown, in some embodiments the profiled features 218 may be shaped to interact with portions of the guide tracks 204 to prevent over rotation in one or more directions. For example, the width of the profiled feature 218 may be sized to permit vertical translation along the track 201 while the length may be dimensioned to prevent rotation to a certain point, at which point rotation is stopped via engagement of the profiled feature with portions of the guide track 204, and in which rotation occurs when the profiled feature is aligned with one of the successive pivot positions. Thus, in some embodiments, a first portion of the hinge pin may interact with the successive pivot positions to permit rotation when the first portion and one of the successive pivot positions are aligned, while a second portion of the hinge pin may interact with part of the guide track to prevent over rotation past the sitting position. As shown, opposite sides of the profiled feature simultaneously engage opposing sides of the guide track 204 for stability. While control of over rotation past the deployed condition may be more critical, the profiled feature may also prevent over rotation past the stowed condition through an opposite interaction. With specific reference to FIG. 4A, the profiled feature 218 is shown aligned to permit vertical translation and/or rotation with an aligned one of the pivot positions. With specific reference to FIG. 4B, the profiled feature 218 is shown rotated to its maximum rotational position, to achieve the sitting position, and interacting with facing portions of the guide track 204 to prevent any further rotation past the sitting position. Other configurations of mechanical stops may include features coupled to or defined in the frame elements, or other features interacting with the lever arms or directly with the seat pan.

In use, with the seat pan initially in the fully stowed condition, the lever arms are substantially vertically oriented and below the backrest. The hinge pin profile allows the lever arms to tilt forward slightly so as not to interfere with the backrest when raising the seat pan. Once tilted slightly forward, the seat pan can be raised by translating (e.g., sliding) the seat pan hinge pins along the respective T-slots provided in the frame element. Once the hinge pins align with any of the successive pivot positions (e.g., two, three, four or more metering circular profiles) at the top of the slots, the seat pan is permitted to open freely. If the seat pan hinges are not aligned with one of the successive pivot positions the seat pan will not open. A hard stop feature, such as that shown in FIGS. 4A and 4B, stops the rotation of the seat pan lever arms after about a quarter turn of the seat pan lever arms or when the seat pan becomes substantially horizontal to allow the occupant to be seated. Since the outer circular profiles of the seat pan hinges engage with the circular profiles of the metering openings, the seat pan lever arms will not descend down within the slots provided in the frame element when the load acts on the seat pan. The same procedure can be applied in the reverse order to stow the seat pan. After the seat pan descends completely it can be stowed in a vertical orientation in the vertical plane of the backrest. The load on the seat pan is transferred directly from the seat pan to the seat pan lever arms, then to the seat pin hinge pins, and ultimately to the metered openings in the frame elements.

Figure 5:
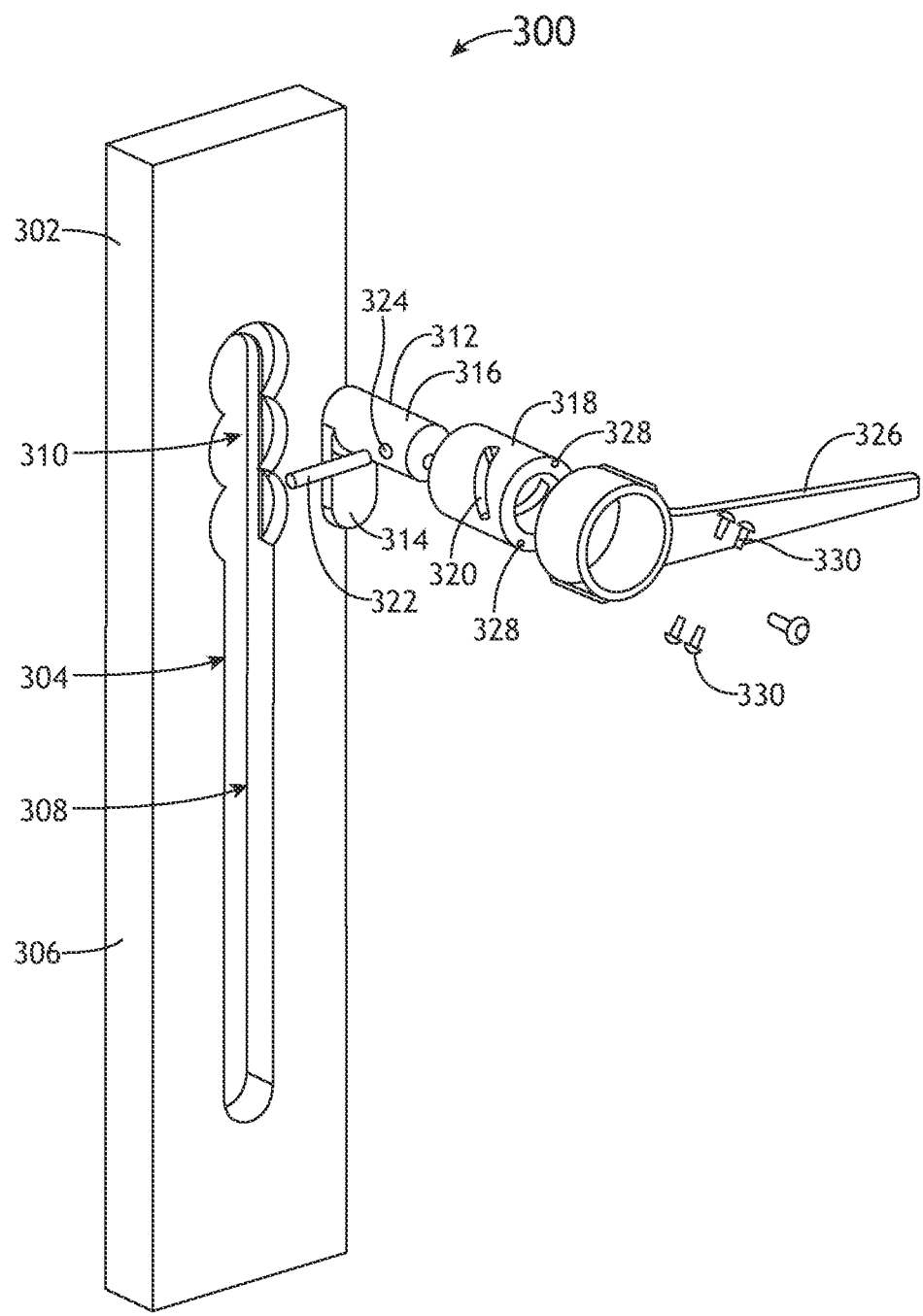
FIG. 5 shows an exploded view of the seat pan hinge in accordance with a second embodiment of the present disclosure.
Figure 6A:
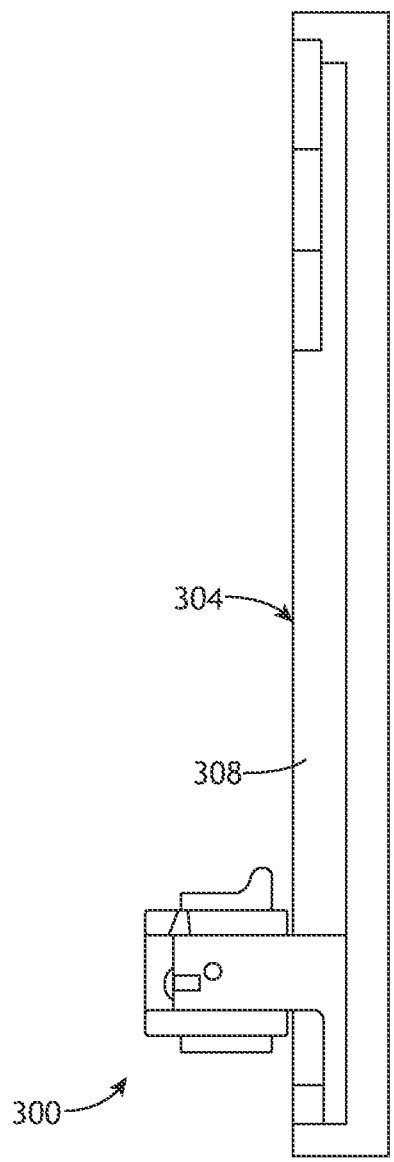
FIGS. 6A-6F shows various positions of the hinge pin and corresponding conditions of the seat pan according to the second embodiment of the present disclosure.
Figure 6B:
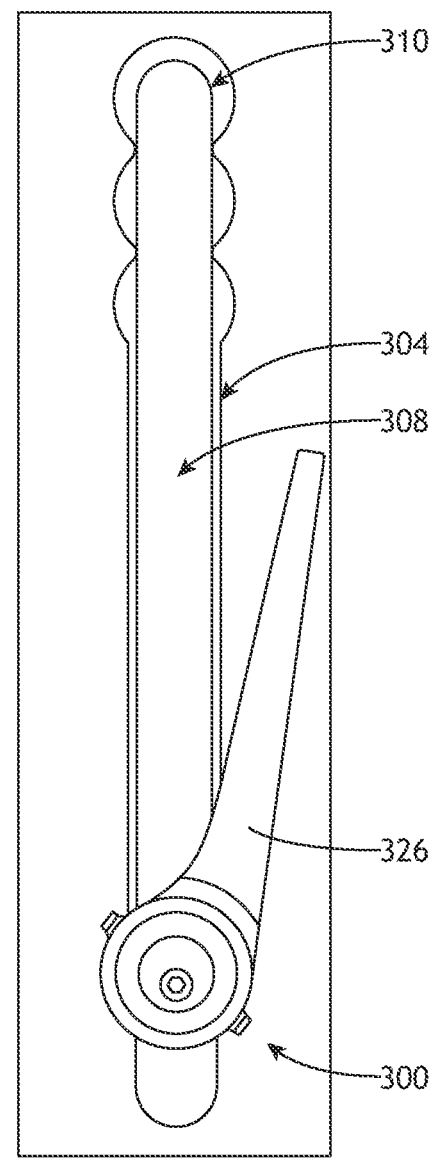
Figure 6C:
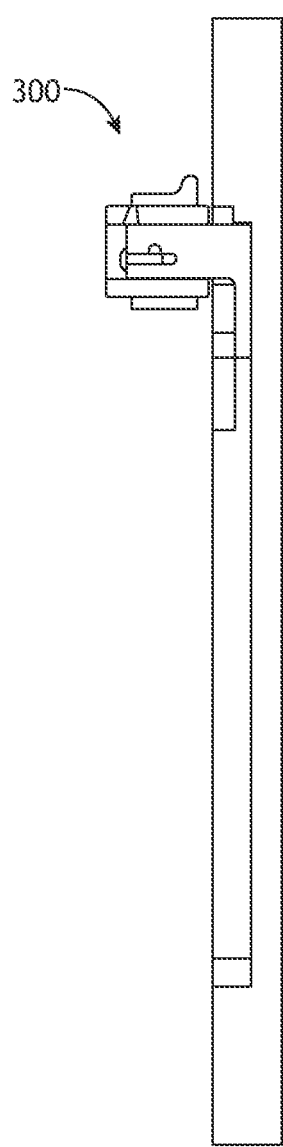
Figure 6D:
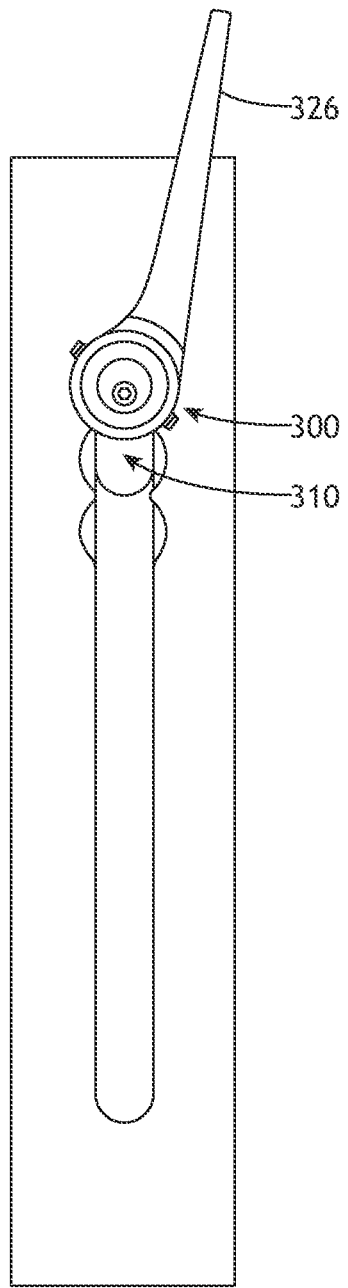
Figure 6E:
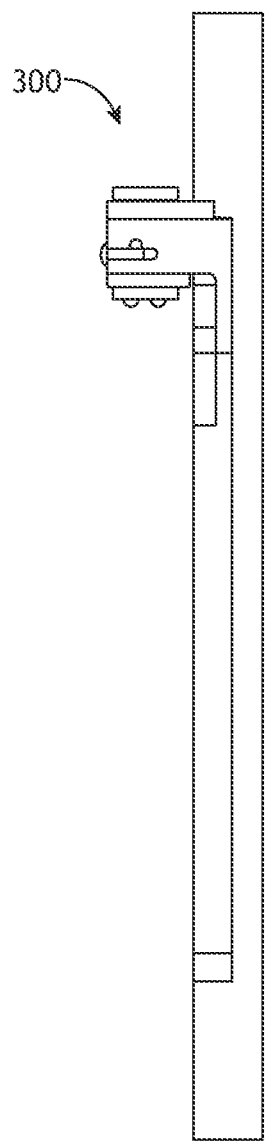
Figure 6F:
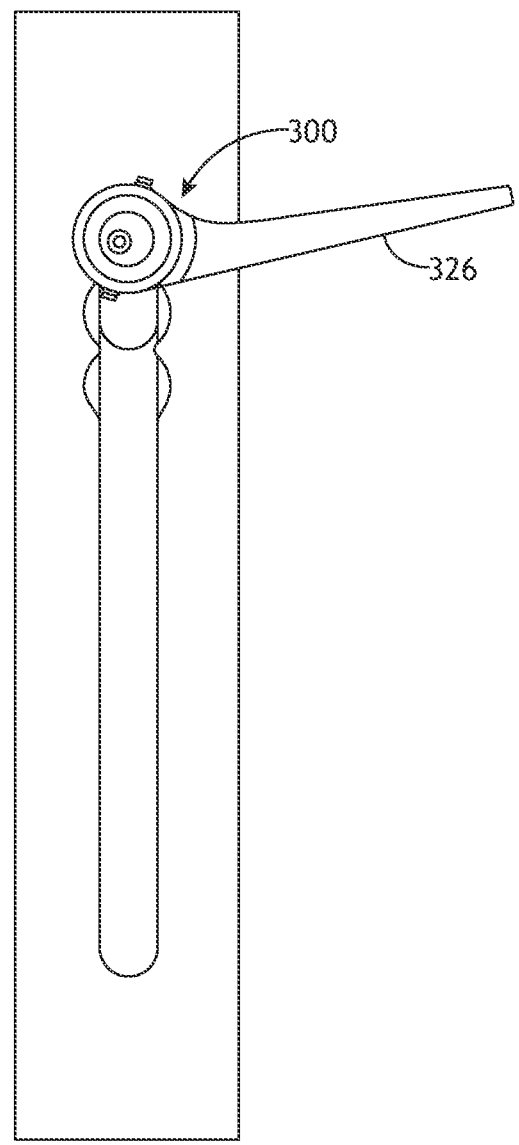

With reference to FIG. 5, according to another exemplary embodiment of the present disclosure, a portion of a second mechanism for stowing the seat pan and enabling height adjustment is shown generally at 300. As with the first embodiment, only one-half of the mechanism 300 is shown and without the seat pan for clarity of the disclosure; however, it is understood that the mechanism includes like elements symmetrically positioned in spaced apart relation supporting a seat pan therebetween. The mechanism 300 again includes frame elements 302 positioned in spaced apart relation which may be implemented as elongate vertical members supporting both the coupled backrest and the movably coupled seat pan. Each frame element 302 is provided with a vertical guide track 304 positioned along its inboard facing side 306. In the complete mechanism, the guide tracks 304 face each other and are parallel and horizontally aligned.

Each guide track 304 includes an elongate slot having a linear portion 308 and successive pivot positions 310, for example implements as circular metered openings, provided at the upper end of the linear portion 308. The guide tracks 304 may include any predetermined number of pivot positions, for instance two, three, or four or more, depending on the desired number of possible height adjustments. Each successive pivot position 310 corresponds to a different seat pan deployment height. As shown, the metered circular openings are formed at a shallow depth in the slot such that the seat pan hinge pin can travel along the full length of the slot and the barrel look can be driven in or out of engagement with one of the aligned circular openings, as discussed further below.

The hinge pin 312 interacts with the guide track 304 by sliding vertically up or down along the length of the slot. The hinge pin 312 includes a first portion 314 which is elongate to prevent rotation of the hinge pin within the slot, and a second portion 316 having a cylindrical profile. A barrel lock 318 is assembled over the cylindrical profile of the hinge pin 312. The barrel lock 318 is provided with a longitudinally extending helical slot 320. A barrel lock pin 322 is inserted through the helical slot 320 and is received in an opening 324 provided in the cylindrical profile of the hinge pin 312 such that the barrel lock pin 322 is fixed relative to the hinge pin 312 and the barrel lock pin 322 is operable for converting the rotational motion of the lever arm 326 into helical motion of the barrel lock 318.

The barrel lock 318 and the lever arm 326 are slidably coupled to allow horizontal translation of the barrel lock 318 relative to the lever arm 326 while rotational motion therebetween is prevented. Linear slots 328 provided along diametrically opposed sides of the outer circumference of the barrel lock 318 receive a set of barrel screws 330 that engage in the linear slots 328. The set of screws 330, or similar feature(s), are operable for transferring rotational motion from the lever arm 326 to the barrel lock 318 and the screw/slot arrangement permits the barrel lock 318 to slide horizontally in and out of engagement with the pivot positions.

With reference to FIGS. 6A-6F, the seat pan adjustment mechanism is shown in various positions and configurations. With specific reference to FIGS. 6A and 6B, the mechanism 300 is shown positioned along the linear portion 308 of the guide track 304 corresponding to the closed or stowed condition of the seat pan. The seat pan is pivoted by means of the lever arms 326. Rotation of the lever arm 326 toward the closed or stowed condition drives the barrel lock 318 out of engagement with the slot according to the helical motion of the barrel lock 318, and further into the lever arm 326 according to the translational coupling of the barrel lock 318 and the lever arm 326. With specific reference to FIGS. 6C and 6D, in the closed or stowed condition the mechanism 300 can be translated vertically upward into alignment with a chosen one of the metered circular openings 310 formed in the face of the slot. With specific reference to FIGS. 6E and 6F, rotational (e.g., pivoting) motion of the lever arm 326 toward the open or deployed condition drives the barrel lock 318 away from the lever arm 326 and into engagement within the chosen and aligned metered opening according to the helical motion of the barrel lock 318.

In use, with the seat pan initially in the fully stowed condition, the lever arms are substantially vertically oriented and below the backrest. Spacing between the outboard face of the barrel lock and the face of the slot permits the lever arm to rotate slightly to open the seat pan to clear the bottom end of the backrest during initial seat pan translation. Once tilted slightly forward the seat pan can be raised into alignment with any one of the metered openings provided on the frame such that the lever arm can rotate to open the seat pan to the deployed condition. The hinge pin holds the barrel lock pin which drives the barrel lock through the helical slot. When the barrel lock is rotated by the seat pan lever arm, due to the presence of the barrel lock pin held in the hinge pin and the helical slot formed in the barrel, the barrel lock is driven outwards (i.e., toward the frame element) by helical motion into the aligned one of the circular metering profiles provided in the frame element. The rotation of the lever arm and the barrel lock pin are operable for converting the rotational motion of the lever arm into helical motion of the barrel lock to lock or unlock the barrel lock relative to the slot. If the mechanism is not aligned with one of the metered openings the seat pan will not open to the deployed condition.

Figure 7A:
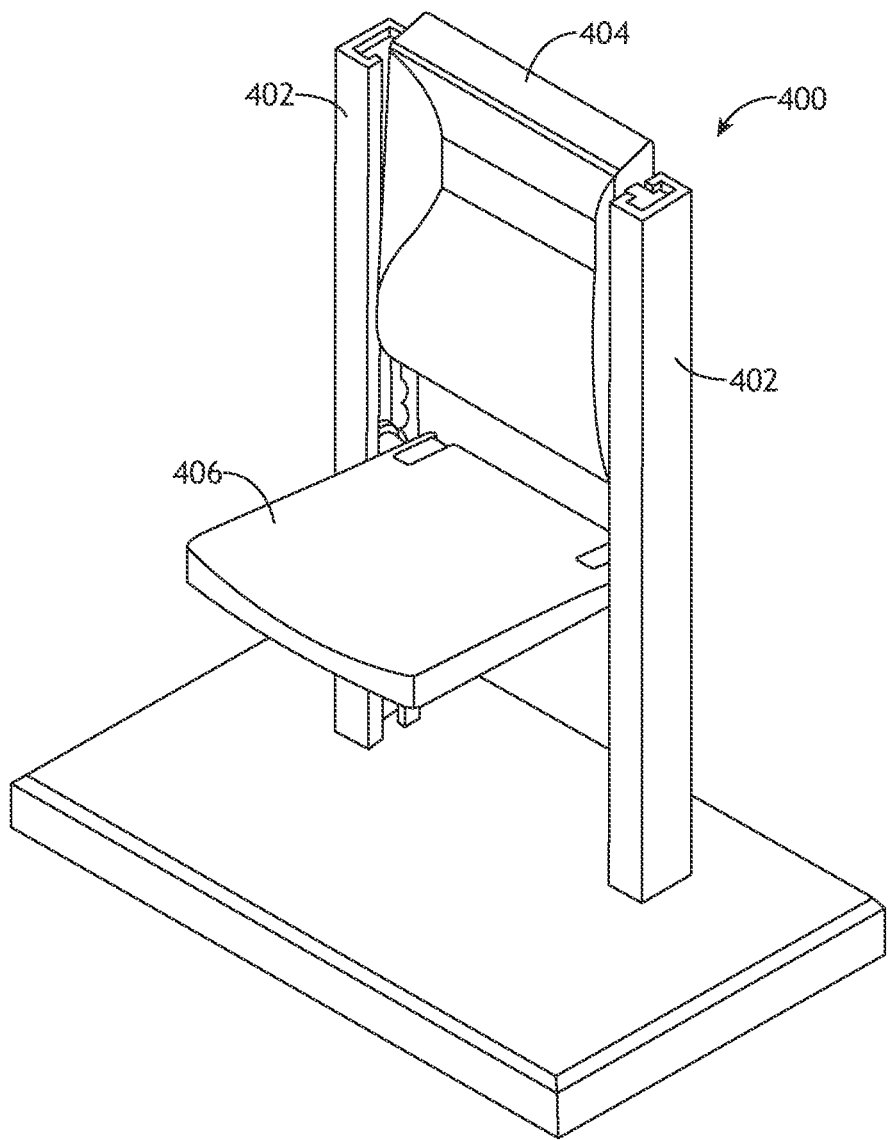
FIGS. 7A and 7B show a repositionable seat pan assembly implemented in a cabin attendant seat in accordance with an embodiment of the present disclosure.
Figure 7B:
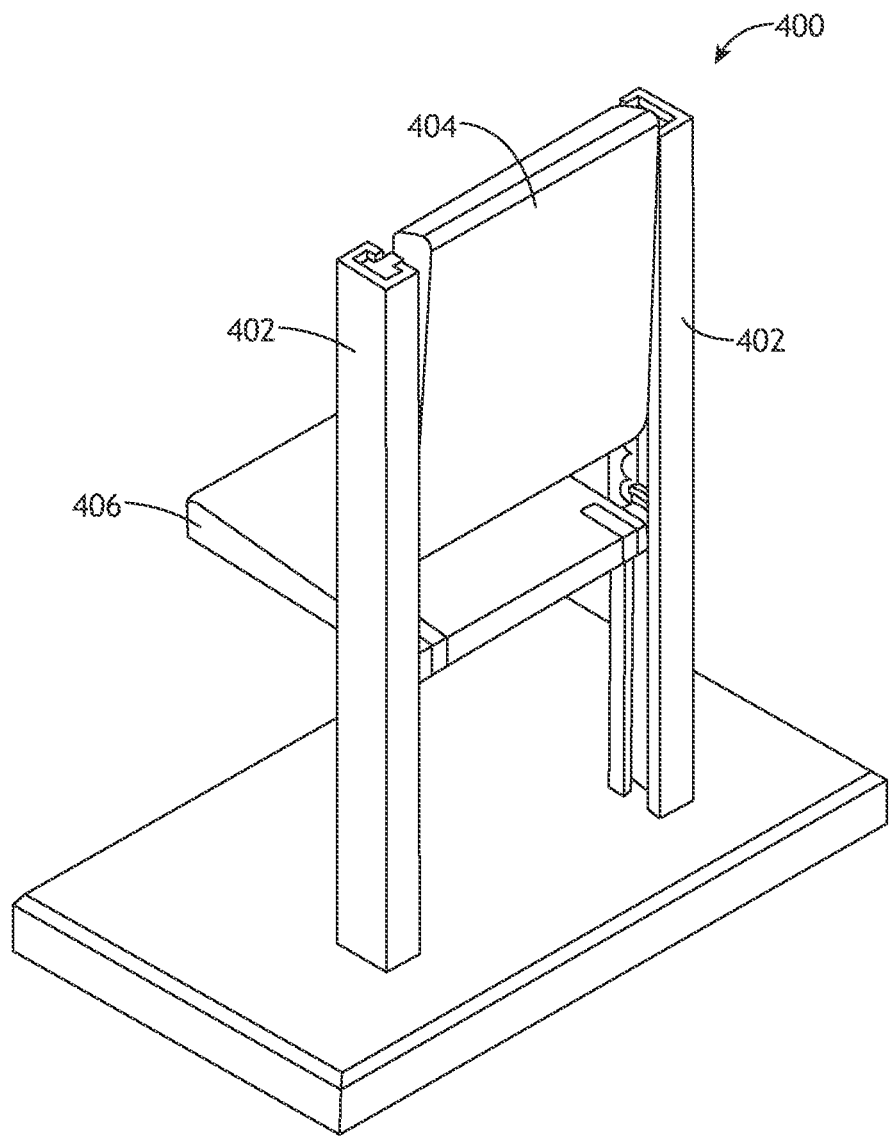
Figure 8:
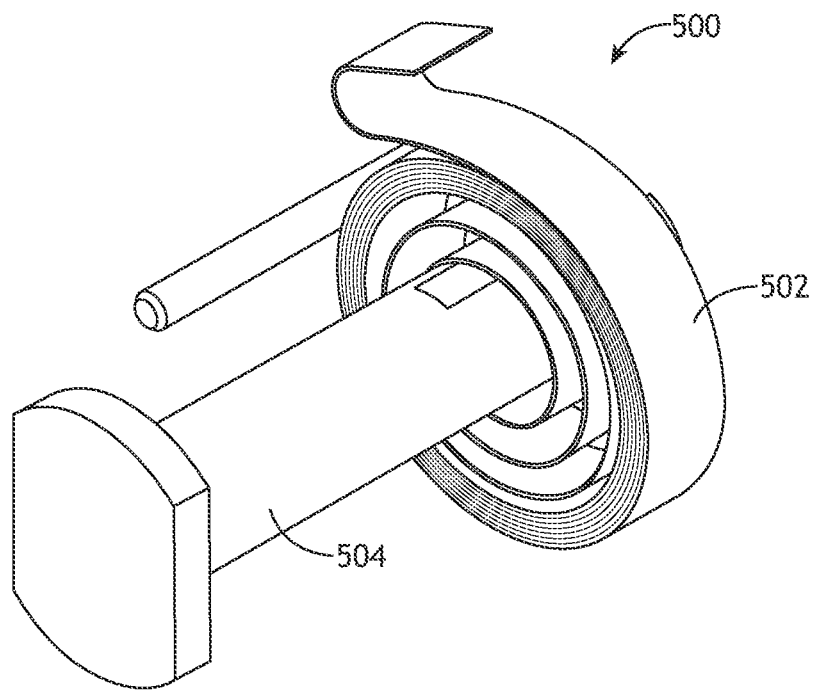
FIG. 8 shows a spring assist mechanism in accordance with an embodiment of the present disclosure.

With reference to FIGS. 7A and 7B, an exemplary implementation of one of the mechanisms according to the first or second embodiment is shown at 400. As shown, the frame elements 402 positioned in parallel spaced apart relation extend vertically upward to support the backrest 404 separate from the repositionable seat pan 406. With reference to FIG. 8, the mechanisms according to the present disclosure may further include a biasing mechanism 500 for biasing the seat pan toward the closed or stowed condition to provide a self-stowing function. In an exemplary embodiment, the biasing mechanism 500 may be implemented as spiral torsion spring 502 including spring steel having a first end coupled to the frame or other static element and a second end coupled to the seat pan assembly, for instance to an implementation of the hinge pin 504, such that opening the seat pan winds the spring. Other spring configuration known to those skilled in the art can be implemented.

Benefits of the mechanisms according to the present disclosure include a thin profile when the seat pan is in the fully stowed condition and lighter weight as compared to conventional auxiliary seats. Further, the locking and unlocking of the seat pan is achieved by the opening and closing motion of the seat pan, thereby obviating the need for separate links or components with dedicated locking functions. In addition, the mechanisms include a provision for inadvertent seat pan deployment when stowed. Lastly, unlike convention auxiliary seats having a fixed seat pan height, the mechanisms according to the present disclosure provide adjustability to accommodate occupants of a larger demographic of the population while improving seat comfort.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A cabin attendant seat for an aircraft, comprising:
spaced frame elements including parallel guide tracks each having a linear portion and successive pivot positions formed at one end of the linear portion, each of the successive pivot positions corresponding to a different seat pan height;
a backrest coupled to the spaced frame elements above the parallel guide tracks; and
a seat pan movably coupled to the parallel guide tracks, the seat pan configured to translate along the linear portions of the guide tracks when the seat pan is in a stowed condition and configured to pivot between the stowed condition and a deployed condition when aligned with one of the successive pivot positions, wherein the seat pan pivots toward the deployed condition to lock the seat pan in the aligned one of the successive pivot positions and pivots toward the stowed condition to unlock the seat pan from engagement in the aligned one of the successive pivot positions, and wherein the seat pan when in a fully stowed condition is positioned below the backrest;
wherein each of the successive pivot positions comprises a circular opening having a diameter which is greater than a width of the linear portion.

2. The cabin attendant seat according to claim 1, wherein the seat pan on each opposing side therefore comprises:
a hinge pin engaged in one of the parallel guide tracks, the hinge pin having a first portion for maintaining the hinge pin in the guide track and a second portion extending from the first portion and defining a feature that interacts in a first orientation with the linear portion to permit vertical translation of the hinge pin along the linear portion, and interacts in a second orientation, different from the first orientation, with one of the successive pivot positions to prevent vertical translation of the hinge pin; and
a lever arm coupled to the hinge pin;
wherein pivoting motion of the lever arm rotates the feature between the first and second orientations.

3. The cabin attendant seat according to claim 2, wherein:
the feature comprises first and second pairs of diagonally opposed parallel faces;
the first pair of diagonally opposed parallel faces interacts with the linear portion when the seat pan is in the fully stowed condition;
the second pair of diagonally opposed faces interacts with the linear portion when the seat pan is in the stowed condition;
the seat pan is most vertical when in the fully stowed condition; and
a length of the feature is greater than a width of the linear portion.

4. The cabin attendant seat according to claim 1, wherein the seat pan on each opposing side thereof comprises:
a hinge pin slidable along a length of one of the guide tracks;
a barrel lock positioned over a cylindrical portion of the hinge pin, the barrel lock defining a longitudinally extending helical slot;
a pin received through the longitudinally extending helical slot and received in an opening formed in the cylindrical portion such that the pin is movable along a length of the longitudinally extending helical slot and fixed relative to the hinge pin; and
a lever arm coupled to the barrel lock;
wherein, when the seat pan is aligned with one of the successive pivot positions, pivoting motion of the lever arm toward the deployed condition of the seat pan drives the barrel lock into engagement with the aligned one of the successive pivot positions and pivoting motion of the lever arm toward the stowed condition of the seat pan drives the barrel lock out of engagement with the aligned one of the successive pivot positions, wherein driving motion is driven by movement of the pin along the length of the longitudinally extending helical slot.

5. The cabin attendant seat according to claim 4, wherein the pin is operable for converting the pivoting motion of the lever arm into helical motion of the barrel lock.

6. The cabin attendant seat according to claim 4, wherein the barrel lock and the lever arm are slidably coupled to permit horizontal translation of the barrel lock relative to the lever arm as the lever arm pivots between the stowed condition and the deployed condition of the seat pan.

7. The cabin attendant seat according to claim 6, further comprising diametrically opposed longitudinal slots formed along an exterior surface of the barrel lock, wherein barrel screws threaded through the lever arm engage in the diametrically opposed longitudinal slots to guide the horizontal translation of the barrel lock relative to the lever arm.

8. The cabin attendant seat according to claim 1, further comprising a biasing mechanism coupled to the seat pan for urging the seat pan toward the fully stowed condition.

9. A height adjustable seat pan assembly, comprising:
spaced frame members including parallel guide tracks each defining successive pivot positions arranged in vertical alignment, wherein each successive pivot position corresponds to a different seat pan height; and
a seat pan movably coupled to the parallel guide tracks, the seat pan configured to translate vertically between different ones of the successive pivot positions when the seat pan is in a stowed condition, and configured to pivot between the stowed condition and a deployed condition when aligned with one of the successive pivot positions, wherein the seat pan pivots toward the deployed condition to lock the seat pan in the aligned one of the successive pivot positions and pivots toward the stowed condition to unlock the seat pan from engagement in the aligned one of the successive pivot positions;
wherein the seat pan on each opposing side therefore comprises:
a hinge pin engaged in one of the parallel guide tracks, the hinge pin having a first portion for maintaining the hinge pin in the guide track and a second portion extending from the first portion and defining a feature that interacts with the successive pivot positions; and
a lever arm coupled to the hinge pin;
wherein pivoting motion of the lever arm rotates the hinge pin; and
wherein the stowed condition of the seat pan corresponds to a generally vertical orientation of the feature permitting vertical translation of the seat pan relative to the guide track, and the deployed condition of the seat pan corresponds to a generally horizontal position of the feature preventing vertical translation of the seat pan relative to the guide track.

10. The seat pan assembly according to claim 9, wherein each of the successive pivot positions comprises a circular opening formed in the guide track.

11. The seat pan assembly according to claim 9, wherein the seat pan is most vertical when in the stowed condition.

12. The seat pan assembly according to claim 9, further comprising a biasing mechanism coupled to the seat pan for urging the seat pan toward the stowed condition.

13. The seat pan assembly according to claim 9, wherein the spaced frame members are associated with an aircraft seat.

14. The seat pan assembly according to claim 9, wherein the spaced frame members are associated with an aircraft cabin attendant seat.

15. A height adjustable seat pan assembly, comprising:
spaced frame members including parallel guide tracks each defining successive pivot positions arranged in vertical alignment, wherein each successive pivot position corresponds to a different seat pan height; and
a seat pan movably coupled to the parallel guide tracks, the seat pan configured to translate vertically between different ones of the successive pivot positions when the seat pan is in a stowed condition, and configured to pivot between the stowed condition and a deployed condition when aligned with one of the successive pivot positions, wherein the seat pan pivots toward the deployed condition to lock the seat pan in the aligned one of the successive pivot positions and pivots toward the stowed condition to unlock the seat pan from engagement in the aligned one of the successive pivot positions;
wherein the seat pan on each opposing side thereof comprises:
a hinge pin slidable along a length of one of the guide tracks;
a barrel lock positioned over a cylindrical portion of the hinge pin, the barrel lock defining a longitudinally extending helical slot;
a pin received through the longitudinally extending helical slot and received in an opening formed in the cylindrical portion such that the pin is movable along a length of the longitudinally extending helical slot and fixed relative to the hinge pin; and
a lever arm coupled to the barrel lock;
wherein, when the seat pan is aligned with one of the successive pivot positions, pivoting motion of the lever arm in a first direction drives the barrel lock into engagement with the aligned one of the successive pivot positions and pivoting motion of the lever arm in a second direction opposite the first direction drives the barrel lock out of engagement with the aligned one of the successive pivot positions, wherein driving motion is driven by movement of the pin along the length of the longitudinally extending helical slot.

16. The seat pan assembly according to claim 15, wherein the pin is operable for converting the pivoting motion of the lever arm into helical motion of the barrel lock.

17. The seat pan assembly according to claim 15, wherein the barrel lock and the lever arm are slidably coupled to permit horizontal translation of the barrel lock relative to the lever arm as the lever arm pivots between the stowed condition and the deployed condition of the seat pan.

18. The seat pan assembly according to claim 17, further comprising diametrically opposed longitudinal slots formed along an exterior surface of the barrel lock, wherein barrel screws threaded through the lever arm engage in the diametrically opposed longitudinal slots to guide the horizontal translation of the barrel lock relative to the lever arm.

* * * * *